Jan. 14, 1941.    F. G. HODSDON    2,228,520
TEAT CUP RINSER
Filed Nov. 4, 1937    4 Sheets-Sheet 1
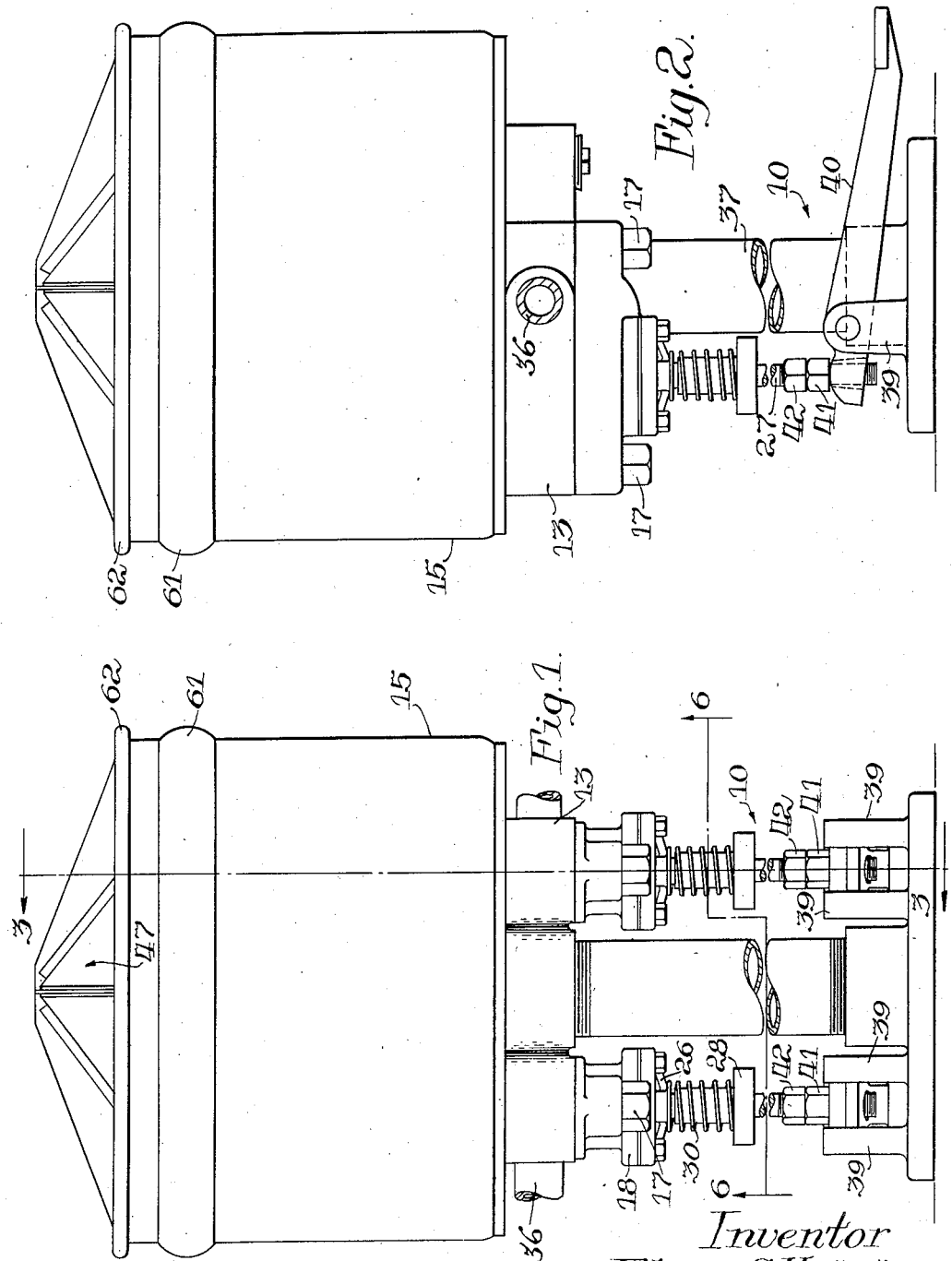
Inventor
Floyd G. Hodsdon
By

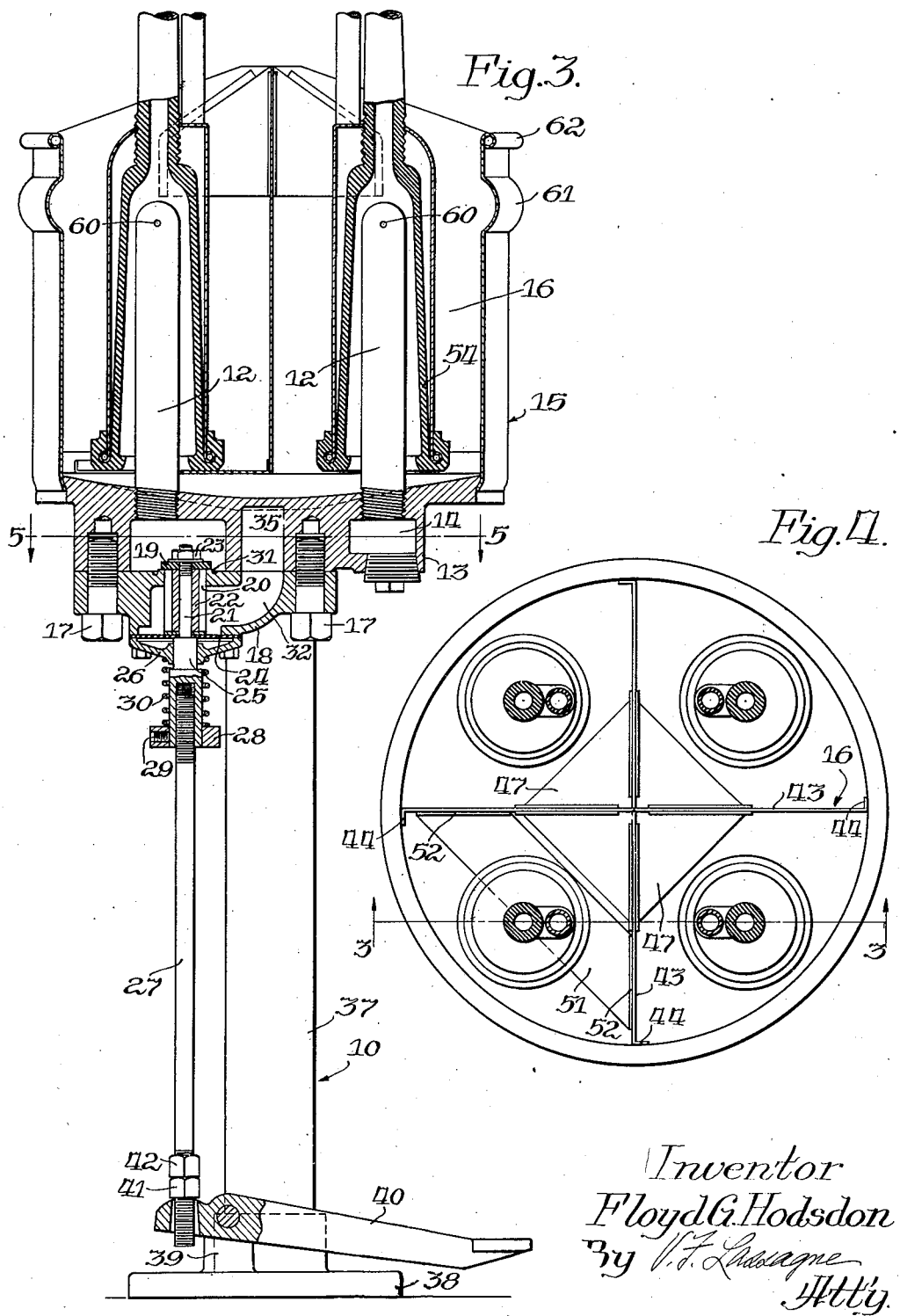

Jan. 14, 1941.   F. G. HODSDON   2,228,520
TEAT CUP RINSER
Filed Nov. 4, 1937   4 Sheets-Sheet 3

Inventor
Floyd G. Hodsdon
By V. F. Lasagne
Atty.

Jan. 14, 1941. F. G. HODSDON 2,228,520
TEAT CUP RINSER
Filed Nov. 4, 1937 4 Sheets-Sheet 4

Inventor
Floyd G. Hodsdon
By V. F. Lauraque
Atty.

Patented Jan. 14, 1941

2,228,520

UNITED STATES PATENT OFFICE 2,228,520

TEAT CUP RINSER

Floyd G. Hodsdon, Milwaukee, Wis., assignor to International Harvester Company, a corporation of New Jersey Application November 4, 1937, Serial No. 172,797

13 Claims. (Cl. 141—1)

This invention relates to an improved teat cup rinser.

Teat cups are ordinarily connected in groups of four, as clusters. They must be cleaned often, frequently as often as after each milking. It is necessary in the cleansing of teat cups to spray them on the inside with cold water and then hot water or steam, and again with cold water, if desired.

The object of this invention is, therefore, to provide a teat cup rinser, which will spray rinse simultaneously the four teat cups of a cluster.

A further object of the invention is to provide a guide member for the rinser, which will aid in placing the teat cups in the rinser in position to be cleansed.

Another object is the provision of a manifold, into which a plurality of spray tubes is attached, and which has connections for hot and cold water.

Still another object of the invention is to provide a teat cup rinser with pedal connections for the supplying of hot and cold water.

Other objects of the invention will become apparent as the disclosure is made.

According to the present invention, the rinser consists of a container member, in the base of which a plurality of spray tubes are mounted. A guide member for the positioning of teat cups over the spray tubes consists of a plurality of walls, and is placed inside the container, so as to extend between the spray tubes. The base of the container is a manifold and has a fluid passage therein in communication with the spray tubes, as well as outside connections to hot and cold water. The container is supported on a pipe, which also serves as a drain for the container. There are valves to control the supply of hot and cold water in the manifold, which are operated by pedals connected to the valves through long rods.

In the drawings—

Figure 1 is a side elevation of the rinser;

Figure 2 is another side elevation taken from a different angle;

Figure 3 is an elevational view taken in section along the line 3—3 of Figure 1;

Figure 4 is a plan view of the rinser;

Figure 5:
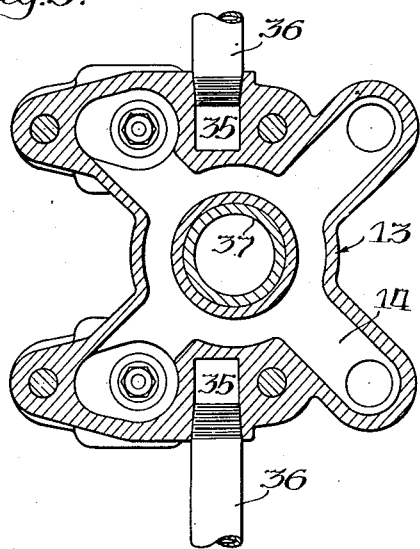
Figure 5 is a section taken along the line 5—5 of Figure 3.

The teat cup rinser 10 consists essentially of a container 11, in the base of which a plurality of spray tubes 12 is mounted. The container consists of a base 13 with a fluid circulating passage 14 therein and side walls comprising a shell 15 extending from the base upwardly around the spray tubes. Positioned in the container and extending between the spray tubes is a guide member 16. The fluid passage 14 is in communication with each of the spray tubes.

Attached to the under-side of the base by screws 17 are a pair of valve housings 18. Valves 19, preferably formed of hard rubber or fabric, are mounted on the valve housings 18 over openings 20. Each valve is positioned on a valve stem 21 and held against a spacer 22 by a nut 23. A diaphragm 24, preferably formed of fabric rubber, is mounted on the valve stem against an enlarged portion 25 and held against the lower side of the valve housing by a valve guide 26. An elongated push rod 27 is threaded into the lower end of the valve stem. A collar 28 is secured to the lower end of the valve stem by means of a set screw 29. A valve spring 30 is held between the collar and the valve guide 26. The tension of the spring tends to hold the valve 19 against a seat 31 in the upper surface of the housing. A passage 32 in the valve is in communication with a passage 35 in the base separate from the passage 14. As seen in Figure 5, the pipes 36 are threaded into the passage 35. The base 13 is carried by a pipe 37, which forms a drain for the container. The pipe 37 is mounted in a support 38, which has upstanding ears 39. In these ears, foot pedals 40 are mounted and rest against nuts 41 on the rods 27, against which nuts 42 are jammed.

Figure 8:
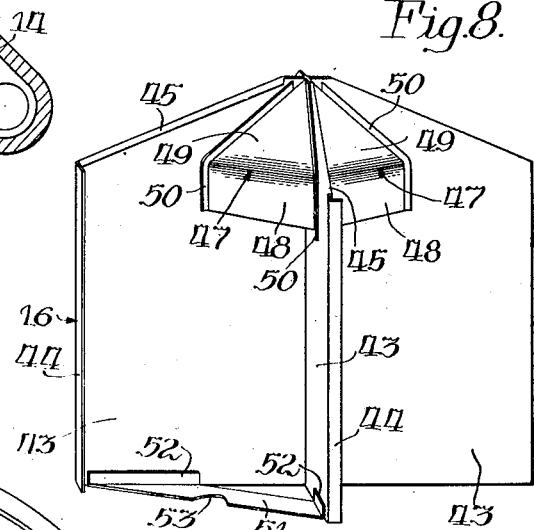
Figure 8 is a perspective view of the guide member.
Figure 6:
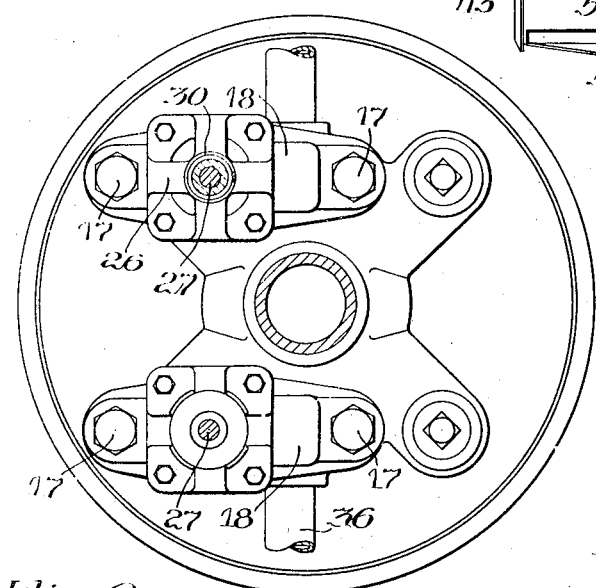
Figure 6 is a section taken along the line 6—6 of Figure 1.

The spray tubes 12 are spaced equally about the base 13, and the guide member 16 separates the tubes from one another. As shown in Figure 8, this guide member consists in effect of a plurality of walls 43 at right angles to one another, extending radially from a common point at the center of the base. The member may conveniently be formed of two intersecting metal plates, each plate slotted for substantially half of its width to receive an unslotted portion of the other plate. There are flanges 44 on the walls in contact with the shell 15, and the upper edges are bent over, as at 45, for reenforcement. Spacer members 47 extend between the walls 43 and have lower vertically extending portions 48 and upper sloping portions 49, which meet approximately in a point at the upper edges of the walls 43. The spacer members are connected by welding or soldering to the walls through flanges 50 on the spacer members. A locating member 51 extends between two adjacent walls at their lower edges and is welded or secured thereto by flanges 52. In one side of this member is a semi-circular recess 53 of approximately the same diameter as the spray tubes. This locating member engages one of the spray tubes by its recess and so positions the guide member in the container that the walls are equally spaced between the spray tubes.

Figure 7:
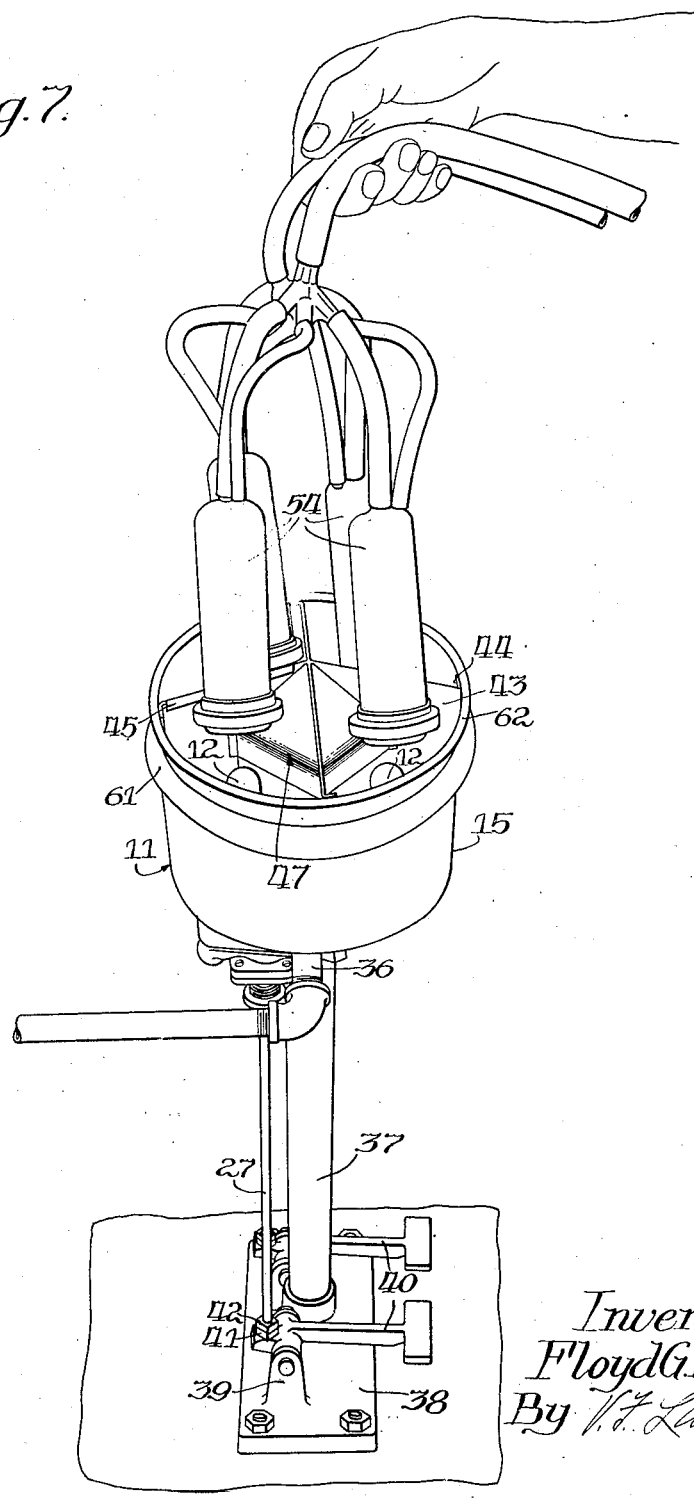
Figure 7 is a view showing the rinser with the teat cups of a cluster ready to be positioned over the spray tubes.

In operation, the user grasps the four teat cups 54 of a rinser, as shown in Figure 7, and brings them into the container. Because the members 47 are sloping and partially close the entrance to the container, the positioning of the teat cups over the spray tubes is facilitated. The teat cups tend to slide down the sloping surfaces into spacers and position themselves over the spray tubes. When the cups are in position, the operator will step on one of the pedals 40 and admit cold water from one of the pipes 36 into its passage 35 in the base and through the passage 32 in the valve housing, up around the valve 19, into the passage 14, up through the spray tubes, and out through openings 60. This cold water comes out of the spray and effects the rinsing of the interior of the teat cups. Then, by actuation of the other pedal 40, hot water is admitted through the other valve into the passage 14, and out through the spray tubes, and the cups are rinsed with hot water. They may again be rinsed with cold water, if desired.

As previously stated, the pipe 37 serves as a drain for the container. If desired, the drain may be stopped up by a suitable plug, and the container filled with water. The water may then be sucked out of the container through the teat cups into the milker receiver jar and used to wash the jar or the milk pipe line.

As seen in Figure 3, there is a large outwardly pressed bead 61 on the shell 15 in line with the openings 60 in the spray tubes. Thus, if water is delivered from the tubes with no teat cups over them, the streams will strike the bead 61 and be deflected toward the center of the container rather than along and out of the container. The container has a curled reenforcing edge 62.

Figure 9:
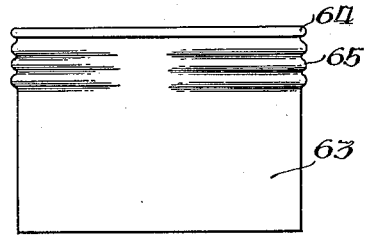
Figure 9 shows a modified form of a shell member.
Figure 10:
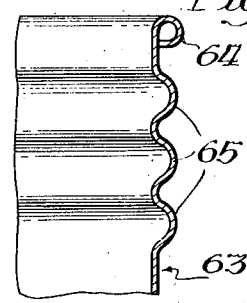
Figure 10 is a sectional view of the rim of the modified form of shell member.

A modified form of shell 63 is shown in Figures 9 and 10. The shell has a curled reenforcing edge 64 similar to the edge 62 of the other shell, as well as a series of outwardly pressed ribs 65, which will serve to prevent the streams from the spray tubes from splashing out of the container as in the case of the bead 61.

From the foregoing description, it will be apparent that applicant has provided an improved teat cup rinser, in which the teat cups of a cluster may be easily positioned over the spray tubes and which may be conveniently operated.

The intention is to limit the invention only in the terms of the claims.

What is claimed is:

1. A teat cup guide comprising a plurality of walls extending radially from a common center, a plurality of spacer members attached to adjacent walls near one end thereof for maintaining the radial positioning of the walls and sloping away from the common center of the walls, whereby the positioning of individual teat cups of a cluster between the walls is facilitated, and a locating member extending between two adjacent walls at the opposite end thereof.

2. A teat cup guide comprising a plurality of partitions extending radialy from a common center and a plurality of spacer members attached to adjacent walls near one end thereof and sloping away from the common center of the walls whereby the positioning of individual teat cups of a cluster between the walls for cleansing is facilitated.

3. In a teat cup rinser, a container, a plurality of spaced spray tubes mounted within the container, and a guide member within the container comprising a plurality of walls extending radially from a common center towards the sides of the container between the spray tubes, a locating member extending between two adjacent walls in engagement with one spray tube so as to maintain a predetermined spacing between all the spray tubes and walls, and a plurality of spacers extending between adjacent walls near one end thereof and sloping away from the common center of the walls, whereby the positioning of a plurality of teat cups of a cluster is facilitated.

4. In a teat cup rinser, a container, a plurality of spaced spray tubes within the container, and a guide member also within the container comprising a plurality of walls extending radially from a common center between the spray tubes into engagement with the side of the container so as to divide the space in the container into a plurality of compartments with a spray tube in each compartment and a plurality of spacer members extending between adjacent walls near one end thereof and sloping away from a common point, whereby the locating of the individual teat cups of the same cluster into separate compartments and over spray tubes is facilitated.

5. In a teat cup rinser, a base, a plurality of spray tubes mounted in the base and extending upwardly therefrom and having side spray openings and a shell extending upwardly from the base around the spray tubes and having a groove extending about the inner surface of the shell on a line with the openings in the spray tubes.

6. In a teat cup rinser, a base having a fluid circulating passage therein, a plurality of spray tubes mounted in the base in communication with the passage therein and having side spray openings, a shell extending upwardly from the base around the spray tubes and having a groove extending about the inner surface of the shell on a level with the openings in the spray tubes.

7. A teat cup rinser comprising a base having a fluid circulating passage therein, a plurality of spray tubes mounted at spaced points in the base in communication with the passage therein and having discharge openings, a shell member extending away from the base around the spray tubes and having a groove on the inner surface opposite the discharge openings, a pair of valve housings carried by the base and having connections to hot and cold water, valves in each of the housings, and means for actuating the valves comprising rods having one end connected to the valves and pedals connected to the opposite end.

8. A teat cup guide member comprising a plurality of walls extending outwardly from a central engagement, and spacer members extending between adjacent walls near one end thereof and sloping away from substantially a common point for facilitating the positioning of individual teat cups of a cluster between the walls.

9. A teat cup guide member comprising a pair of sheet metal plates extending at right angles to one another and intersecting at substantially their mid-sections to form a plurality of walls extending radially from a common center, a plurality of spacer members extending between adjacent walls of the plates near one end thereof and sloping away from the common center of the walls for facilitating the positioning of the individual teat cups of a cluster between the walls.

10. A rinser comprising a plurality of spray tubes having side openings therein and a container surrounding the tubes and having grooves on its inner surface at the level of the openings in the spray tubes.

11. A rinser comprising a plurality of spray tubes having side openings therein and a container surrounding the tubes and having a groove on its inner surface at the level of the openings in the spray tubes.

12. In a teat cup rinser, a container having a groove on its inner surface, a plurality of spaced spray tubes mounted within the container and having side openings at the level of the groove, and a guide member within the container comprising a plurality of walls extending radially from a common center towards the sides of the container between the spray tubes, a locating member extending between two adjacent walls in engagement with one spray tube so as to maintain a predetermined spacing between all the spray tubes and walls, and a plurality of spacers extending between adjacent walls near one end thereof and sloping away from the common center of the walls, whereby the positioning of a plurality of teat cups of a cluster is facilitated.

13. In a teat cup rinser, a container having a groove in the inner surface, a plurality of spaced spray tubes within the container having side spray openings at the level of the groove, and a guide member also within the container comprising a plurality of walls extending radially from a common center between the spray tubes into engagement with the side of the container so as to divide the space in the container into a plurality of compartments with a spray tube in each compartment and a plurality of spacer members extending between adjacent walls near one end thereof and sloping away from a common point, whereby the locating of the individual teat cups of the same cluster into separate compartments and over spray tubes is facilitated.

FLOYD G. HODSDON.